INVENTORS.
ROBERT LAPSLEY
OSCAR H. BANKER
BY
ATTYS.

Nov. 1, 1955   R. LAPSLEY ET AL   2,722,133
TRANSMISSION
Filed Nov. 15, 1951   8 Sheets-Sheet 2

INVENTORS.
ROBERT LAPSLEY
OSCAR H. BANKER
BY
ATTYS.

INVENTORS.
ROBERT LAPSLEY
OSCAR H. BANKER
BY
ATTYS.

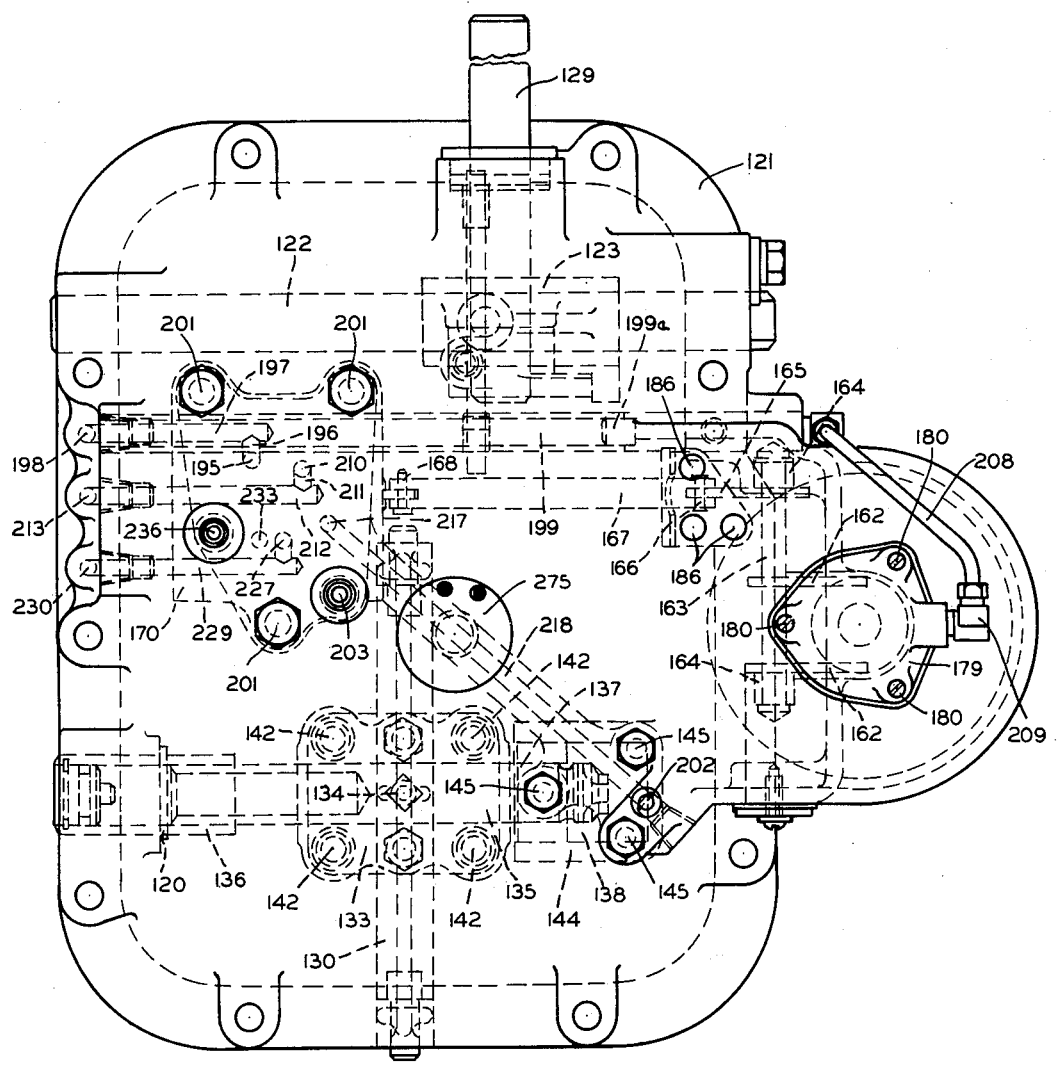

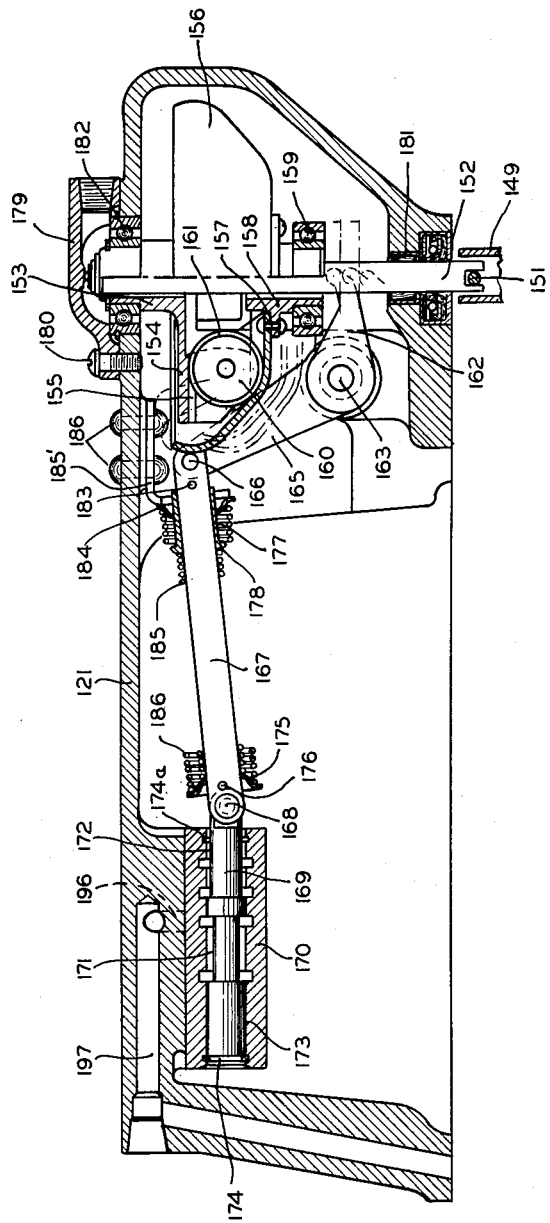

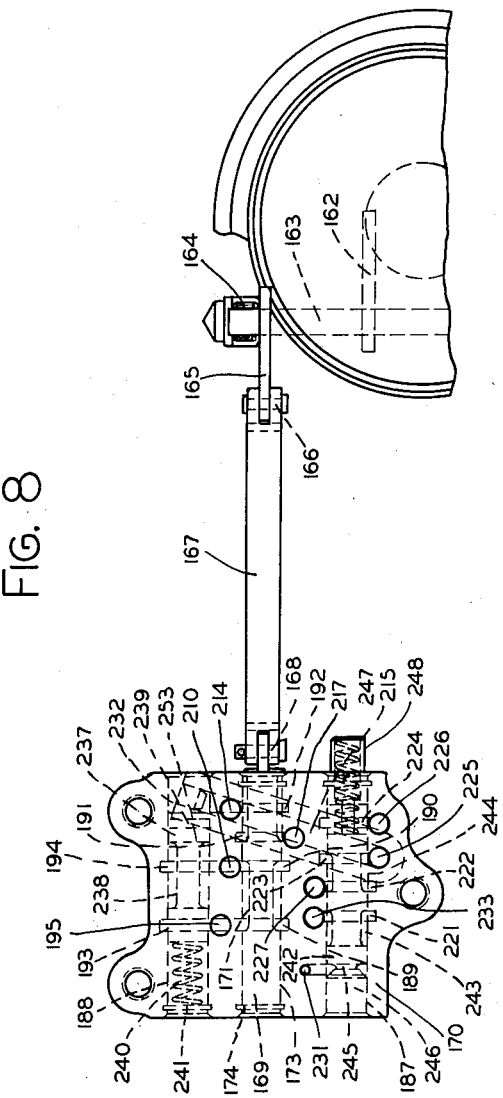

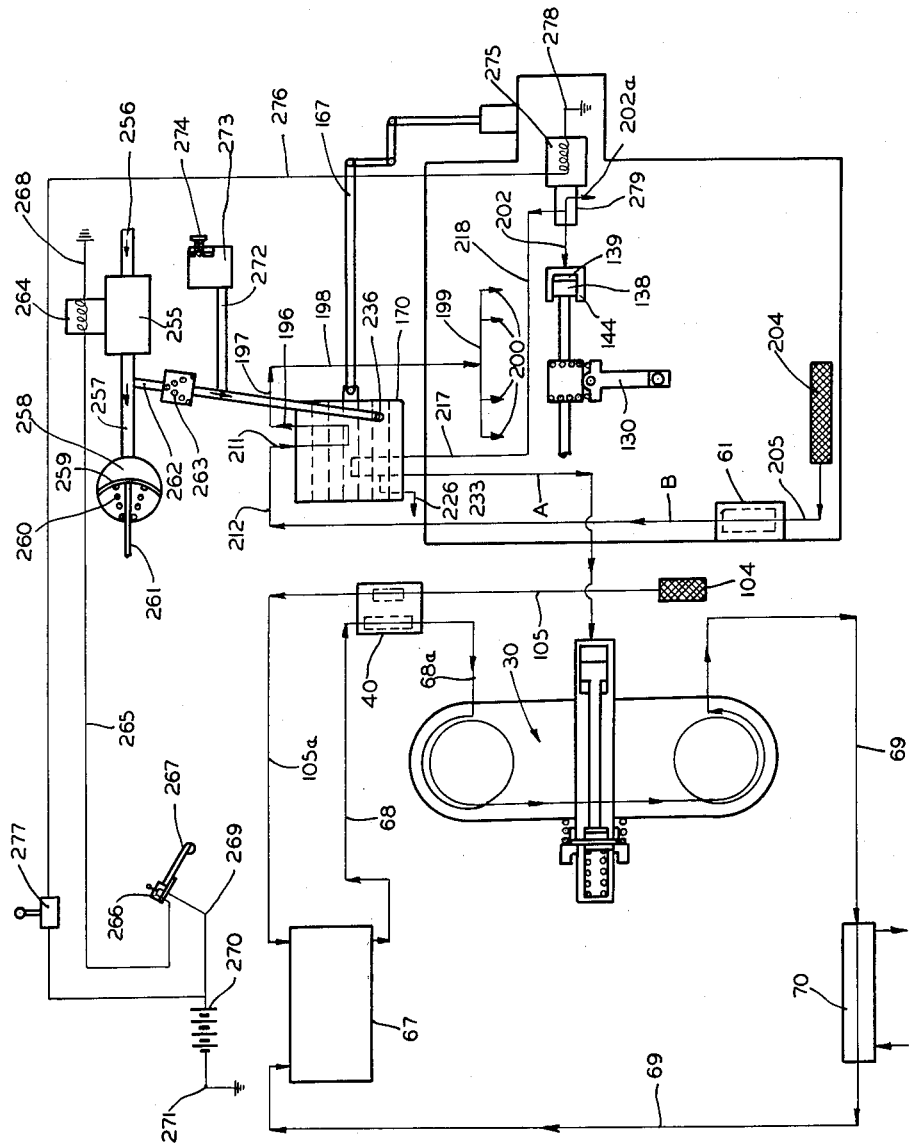

United States Patent Office 2,722,133
Patented Nov. 1, 1955

2,722,133
TRANSMISSION

Robert Lapsley, Buchanan, Mich., and Oscar H. Banker, Chicago, Ill., said Lapsley assignor to Clark Equipment Company, Buchanan, Mich., a corporation of Michigan, and said Banker assignor to New Products Corporation, Chicago, Ill., a corporation of Delaware Application November 15, 1951, Serial No. 256,406

9 Claims. (Cl. 74—472)

Our invention relates generally to transmissions, and, more specifically, is directed to combination torque converter and transmission units suitable for use, for example, with self-propelled vehicles, such as trucks, tractors, buses, and other like vehicles.

It is an object of our present invention to provide a mechanism for effecting the selective clutching of either one of two gears to a shaft on which the gears are rotatably mounted only when the shaft and the gear to be coupled thereto are rotating synchronously.

In the preferred form of our invention, we contemplate the provision of a shift mechanism for a transmission having a shaft with two gears rotatably mounted thereon. Mounted on the shaft intermediate of the gears is an axially slidable clutch collar member which preferably is adapted normally to clutch one of the gears to the shaft. A fluid actuated support member is mounted for movement parallel to the axis of the shaft. A shift fork is pivotally mounted at one end to the support member and at the other end is disposed in engagement with the clutch collar member.

In the preferred form of our invention spring loaded plungers carried by the support members are provided for spring loading the shift fork when the support member is shifted toward the other gear for effecting disengagement of the clutch collar member and the one gear when the latter and the clutch collar member are rotating synchronously and for effecting snap engagement of the clutch collar member with the other gear when the latter and the clutch collar member are rotating synchronously.

It is another object of our present invention to provide speed responsive valve means for use with fluid actuated control means for a torque converter and transmission unit which will, at predetermined speeds of rotation of the output shaft of the transmission, enable actuation of the transmission to effect different drive ratios between the torque converter and the output shaft, and at a predetermined speed of rotation of the output shaft, in excess of the aforementioned predetermined speeds of rotation, enable the pump and turbine of the torque converter to be locked together.

A transmission with which the valve means of our present invention is particularly adapted for use comprises first fluid actuated clutch means adapted to lock the pump and turbine elements together for conjoint rotation. The transmission further comprises gear means between the input and output shafts thereof for effecting a high ratio drive therebetween, including a gear clutched to the output shaft in one direction of rotation and freely rotatable thereon in the other direction of rotation. The input and output shafts are adapted to be locked together for conjoint rotation by second fluid actuated clutch means. A first valve having neutral, first, and second positions is provided, communicating with a source of fluid under pressure through a first passageway. A second passageway is provided between the valve and the second fluid actuated clutch means, and a third passageway between the valve and the first fluid actuated clutch means. When the valve is in the first position the first and second passageways are placed in communication, and when in the second position the first, second, and third passageways are placed in communication. The position of the valve is controlled, in the preferred embodiment of our invention herein disclosed, by a centrifugally operated governor. At idle or slow speed the valve is in neutral, and high ratio drive is effected to the output shaft through the gear means. At an intermediate speed the governor shifts the valve to the first position and fluid is admitted to the second clutch means for conditioning the latter for actuation to effect a low ratio drive. Low ratio drive is effected when the input and output shafts rotate synchronously. At a still higher predetermined speed the governor shifts the valve to the second position and fluid is admitted to the first clutch means for conditioning the latter for actuation to effect a direct drive. Direct drive is effected when the pump and turbine elements rotate synchronously.

The valve means further comprise a second valve in the third passageway which, in one position, permits fluid flow through the passageway, and, in a second position, interrupts fluid flow through the third passageway. Movement of the second valve is preferably controlled by compressed air, the admission of which, in turn, may, for example, be controlled by a solenoid operated valve electrically connected to a source of electricity through a switch preferably mounted beneath an accelerator pedal of a vehicle in which the transmission is embodied. When the solenoid is energized the valve associated therewith is opened and air is admitted adjacent one end of the second valve to shift the latter to the second position, interrupting fluid flow through the third passageway, thus conditioning the first fluid operated clutch means for disengagement which is effected when the pump and turbine elements rotate substantially synchronously.

Lubrication of the various elements of the transmission is controlled through the valve means of our present invention. A lubricating passageway is provided between the first valve and the transmission, which lubricating passageway is placed in communication with the first passageway through the first valve when the latter is in a neutral position. A third valve is also provided which has connection with the first passageway and the lubricating passageway. When the first valve is in either its first or second position the lubricating passageway is placed in communication with the first passageway through the third valve, thus insuring the transmission of fluid to the lubricating passageway under all conditions of operation of the transmission.

Now, in order to acquaint those skilled in the art with the manner of constructing and using the devices of our invention, we shall describe in connection with the accompanying drawings a preferred embodiment of our invention.

In the drawings:

Figure 4 is a plan view of the transmission cover shown in Figure 3;

Figure 7 is a longitudinal vertical sectional view through the transmission cover, showing the governor and the valve mechanism operatively connected therewith;

Figure 8 is a partial plan view of the governor and valve mechanism of Figure 7;

Figure 9 is an end view of the valve mechanism shown in Figure 8; and

Figure 10 is a diagrammatic layout of the fluid operated devices which control the operation of the transmission of Figure 1.

Figure 1:
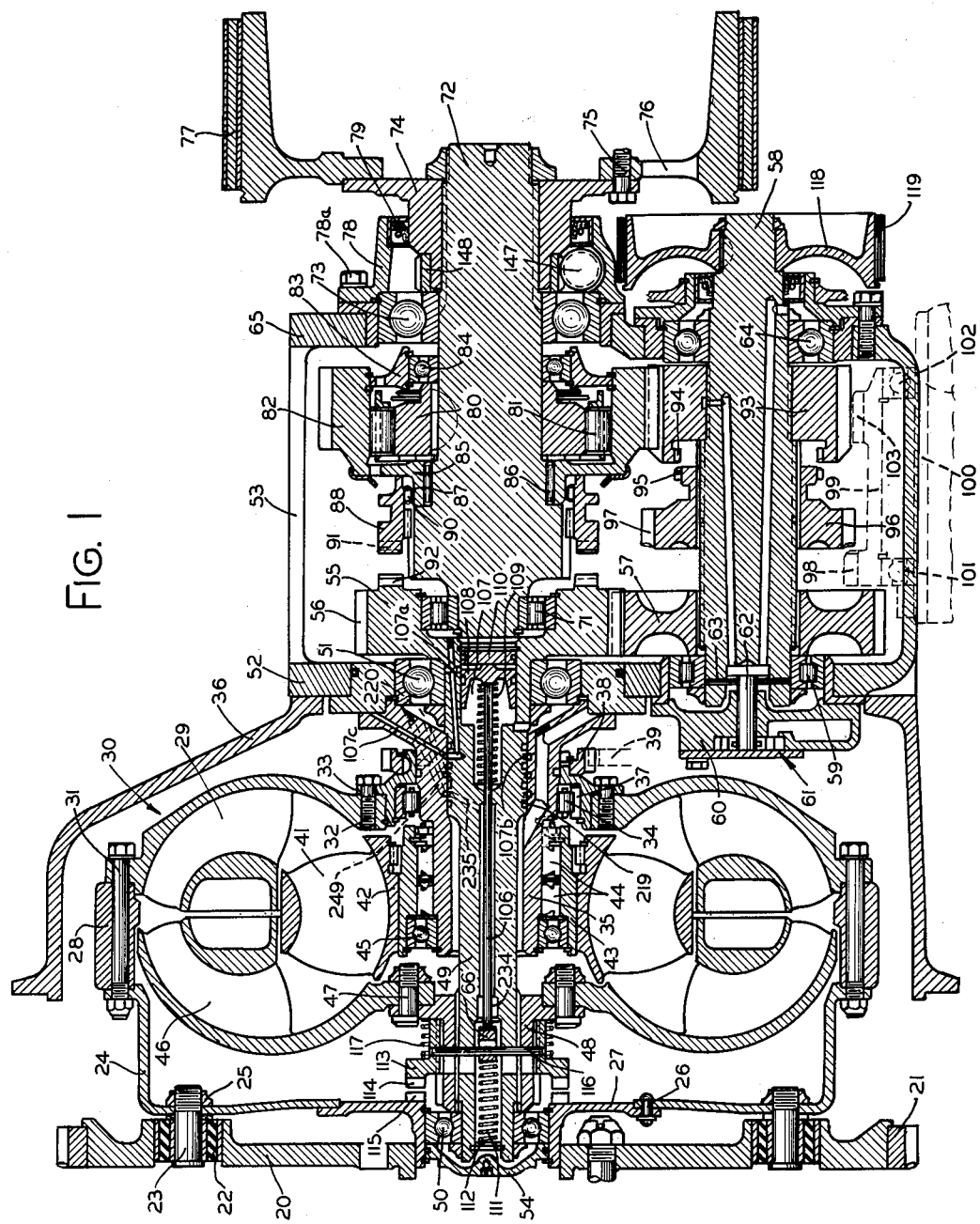
Figure 1 is a horizontal sectional view through a transmission showing the countershaft rotated approximately 110° from its normal position.

Referring now to Figure 1, there is shown a flywheel 20 which is suitably connected to a prime mover, as, for example, an internal combustion engine (not shown). The outer periphery of the engine flywheel 20 is provided with an external ring gear 21 which is adapted to have meshing engagement with a conventional starter motor (not shown). Disposed in circumferentially spaced openings formed in the flywheel 20 are a plurality of resilient bushing members 22 which are adapted to provide support for a plurality of stud members 23. Secured to the one end of the stud members 23, by means of a plurality of nuts 25, is the radially extending portion of a closure member 24. The radially extending portion of the closure member 24 is secured, as by a plurality of rivets 26, to a hub member 27 suitably piloted in a central opening formed in the engine flywheel 20. The outer end of the axially extending portion of the closure member 24 is disposed in juxtaposition of the one side of a peripheral annular flange member 28, which flange 28, at its other side, engages the outer periphery of the pump or drive element 29 of a fluid torque converter, indicated generally by the reference numeral 30, disposed within a bell housing 36. The closure member 24, annular flange 28, and pump element 29 are secured together by means of a plurality of circumferentially spaced bolts 31, thus defining a housing for the torque converter 30. The pump element 29, at the central portion thereof, is secured, by means of a plurality of circumferentially spaced bolts, to a hub member 33, mounted to an annular race member 37 which is journaled, by means of a plurality of rollers 34, on the intermediate portion of a stepped sleeve member 35 fixedly mounted to the forward end wall 52 of a transmission housing 53. From the foregoing description, it will be realized that the engine flywheel 20, closure member 24, and pump element 29 are adapted to rotate as a unit.

Mounted to the hub member 33, supporting the pump element 29, is an external ring gear 38 which has meshing engagement with a gear 39 provided for driving a fluid pump 40, shown diagrammatically in Figure 10. Rotation of the pump element 29 thus effects rotation of the fluid pump 40. The fluid pump 40 draws fluid from a sump tank 67 through conduit 68 and delivers the fluid under pressure to the torque converter 30 through conduit 68a. From the torque converter 30 the fluid is returned through conduit 69 to the sump tank 67 for recirculation. Disposed about the conduit 69 is a conventional cooler 70 provided for cooling the fluid circulating through the torque converter 30. The fluid pump 40 is provided with a scavenging element which draws fluid through a screen 104 and conduit 105, disposed within the bell housing 36, and returns the fluid to the sump tank 67 through conduit 105a.

The torque converter 30 also comprises a reaction member 41 having a hub portion 42 keyed to a sleeve member 43 which is mounted upon one way brake members 44. The one way brake members 44 are mounted on the reduced end portion of the stepped sleeve member 35 and permit the reaction member 41 to rotate in one direction only. A ball bearing assembly 45 is also provided for rotatably supporting the sleeve member 43 on the reduced end portion of the stepped sleeve member 35.

The torque converter 30 further comprises a turbine or driven element 46 suitably secured, as by a plurality of circumferentially spaced bolts 47, to the radial flange portion of a sleeve member 48. The sleeve member 48 is mounted on the splined end of a shaft 49 which, at its forward end, is journaled within a ball bearing assembly 50 mounted within the hub member 27 secured to the closure member 24. The shaft 49, at its other end, is journaled within the stepped sleeve member 35 and within a ball bearing assembly 51 mounted in the forward end wall 52 of the transmission housing 53. The forward end of the shaft 49 is enclosed by a closure member 54 suitably secured to the inner periphery of the hub member 27.

The rear end of the shaft 49 has an upset end portion 55 which is disposed within the transmission housing 53. The outer periphery of the enlarged end 55 is formed with a plurality of gear teeth 56 which have constant meshing engagement with the teeth of a gear 57 fixed to the forward end of a countershaft 58. The countershaft 58 is rotatably journaled adjacent its forward end in a roller bearing assembly 59, mounted in the forward end wall 52 of the transmission housing 53. The forward end of the countershaft 58 is enclosed by a cap member 60 which carries a small oil pump, indicated generally by the reference numeral 61, driven by the countershaft 58 through a pin member 62 received in the recessed end of the countershaft 58. The member 62 has a slot at its inner end in which is disposed a transverse pin 63 mounted, at its ends, within the countershaft 58. The rear end of the countershaft 58 is rotatably supported in a ball bearing assembly 64 mounted in the rear end wall 65 of the transmission housing 53. The countershaft 58 is formed with a reduced rear end portion which projects outwardly of the rear end wall 65 and has secured thereon a brake drum 118. Associated with the brake drum 118 is a brake band 119 which is provided for braking the drum 118 and the countershaft 58. For a further description of the construction and operation of the brake drum 118 and brake band 119 reference may be had to the copending application of Robert Lapsley, Serial No. 196,876, filed November 21, 1950, now Patent No. 2,616,311.

The upset end of the shaft 49 has a central recessed portion in which is disposed a roller bearing assembly 71, which is adapted to rotatably support the forward reduced end portion of a transmission output shaft 72. The output shaft 72 is supported intermediate its ends by means of a ball bearing assembly 73 mounted within the rear end wall 65 of the transmission housing 53. Mounted to the splined rear end of the output shaft 72, projecting outwardly of the rear end wall 65, is a flange member 74 which has secured at its outer periphery, by means of a plurality of circumferentially spaced bolts 75, a brake drum 76. Associated with the brake drum 76 is a brake band 77 which is provided for braking the drum 76 and the output shaft 72. Disposed about the output shaft 72 is a cap member 78 which is suitably secured, as by bolts 78a, to the rear end wall 65 of the transmission housing 53. An oil seal 79 is interposed between the inner periphery of the cap member 78 and the outer periphery of the flange member 74 for preventing any oil leakage therepast. Mounted on the reduced end portion of the flange 74, within the confines of cap member 78, is a gear 148 which is provided for driving a governor mechanism to be described in detail hereinafter.

Keyed to the intermediate portion of the output shaft 72 is a hub member 80, upon the outer periphery of which is mounted a one way clutch member 81. Mounted upon the one way clutch 81 is a gear member 82. By providing the one way clutch 81 the gear 82 is clutched to the output shaft 72 upon relative rotation in one direction of the former, with respect to the latter. Upon relative rotation in the other direction of the gear 82, with respect to the output shaft 72, the former is freely rotatable on the latter. The gear 82 has associated therewith a radially inwardly extending circumferential flange portion 83 which is rotatably journaled upon a ball bearing assembly 84 mounted to the outer periphery of the output shaft 72. The gear 82 also has a radially inwardly extending circumferential flange portion 85 which is rotatably journaled, by means of a plurality of needle bearings 86, upon the output shaft 72. The radially inwardly extending flange portion 85 has formed at the central portion thereof an annular hub which carries a plurality of external clutch teeth 87. Mounted on the enlarged splined portion of the output shaft 72 is an axially shiftable clutch collar member 88. The clutch collar member 88 has internal clutch teeth 90 which are adapted to engage with the clutch teeth 87 of the gear member 82. The clutch collar member 88 is also provided with radial clutch teeth 91 which are adapted to engage with radial clutch teeth 92 formed on the rear end of gear member 55.

It will thus be observed from the foregoing description that, when the clutch collar member 88 is shifted to the left, from the position shown in Figure 1, and the clutch teeth 91 are disposed in engagement with the clutch teeth 92, the gear 55 will be clutched to the output shaft 72, thus effecting a 1:1 drive between shafts 49 and 72. Likewise, when the clutch collar member 88 is shifted to the right, to the position shown in Figure 1, and the clutch teeth 90 are disposed in engagement with the clutch teeth 87, the gear 82 is clutched to the output shaft 72.

The gear 82 on the output shaft 72 is in constant meshing engagement with a gear 93, rotatably mounted upon the countershaft 58. The gear 93 is formed with internal clutch teeth 94 which are adapted to be engaged by external clutch teeth 95 formed on an axially shiftable clutch collar member 96, mounted on the intermediate splined portion of the countershaft 58 for movement therealong. The clutch collar member 96 is formed with an enlarged gear portion 97 which is adapted to have meshing engagement with the gear portion 98 of a compound gear 99 mounted on a lay shaft 100, by means of a pair of spaced ball bearing assemblies 101 and 102. The compound gear 99 has a gear portion 103 which is in constant meshing engagement with the gear 82 on the output shaft 72. For purposes of clarity, the lay shaft and compound gear 99 are shown revolved from their normal positions. When the clutch collar member 96 is shifted to the right, as viewed in Figure 1, so that the clutch teeth 95 are disposed in engagement with the clutch teeth 94 of the gear 93 on the countershaft 58, the countershaft 58 and output shaft 72 rotate in opposition directions. When the clutch collar member 96 is shifted to the left, as viewed in Figure 1, so that the gear portion 97 is disposed in engagement with the gear portion 98 of the compound gear 99 on the lay shaft 100, the countershaft 58 and the output shaft 72 rotate in the same direction. In the first described position of the clutch collar member 96, that is, to the right, the output shaft 72 is adapted to rotate in the same direction as the engine flywheel 20, whereas when the clutch collar member 96 is shifted to the second described position, that is, to the left, the output shaft 72 is adapted to rotate in the opposite direction as the engine flywheel 20.

When the clutch collar member 96 is shifted to the right, so that the clutch teeth 95 thereon engage the clutch teeth 94 of gear 93, high ratio drive in a forward direction is imparted to gear 82 from gear 55, through gears 57 and 93. The gear 82 when rotating in a forward direction, with respect to the output shaft 72, drives the latter through the aforedescribed one way clutch 81. It will be noted that with the provision of the one way clutch 81 the gear 82 is adapted to drive the output shaft 72 in a forward direction, even though the clutch collar member 88 may be in a neutral position.

When the clutch collar member 96 is shifted to the left, so that the gear portion 97 is disposed in engagement with the gear portion 98 of the compound gear 99, drive in a reverse direction is imparted to gear 82. Since the gear 82 when driven in a reverse direction, with respect to the output shaft 72, rotates freely on the latter the clutch teeth 90 on the clutch collar member 88 must be disposed in engagement with the clutch teeth 87 of gear 82 before drive is effected from the latter to the output shaft 72 in a reverse direction. When the clutch collar member 96 is shifted axially along the countershaft 58 the brake band 119 is applied to the brake drum 118 for braking the latter and the countershaft 58, in order to prevent gear clash between gear portions 97 and 98 or clutch teeth 94 and 95.

When the clutch collar member 88 is shifted to the left so that the clutch teeth 91 are disposed in engagement with the clutch teeth 92 on gear 55, low ratio drive in a forward direction is imparted to the output shaft 72 from shaft 49. It will be realized that when the output shaft 72 is driven in low ratio drive the gear 82 rotates freely thereon.

The aforedescribed construction and operation of the transmission forms the subject matter of and is claimed in the copending application of Oscar H. Banker, Serial No. 195,397, filed November 13, 1950.

Figure 2:
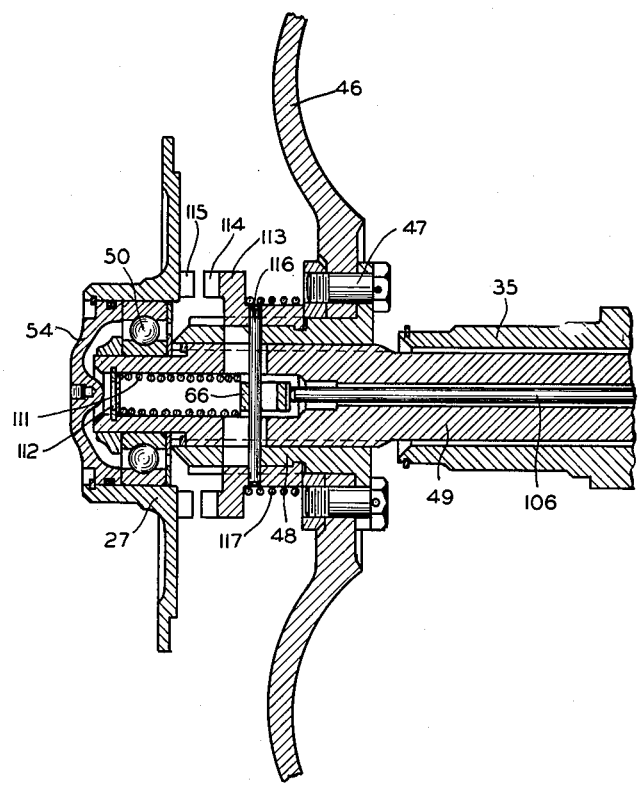
Figure 2 is an enlarged view of a portion of the transmission of Figure 1, showing the means for clutching the drive and driven elements of the torque converter together.

The shaft 49, as shown in Figures 1 and 2, is formed with an axially extending opening therethrough, in which opening is disposed a rod member 106 having an enlarged forward fork end 66. The opening in the shaft 49 is enlarged at the rear end thereof and defines a chamber 107 in which is disposed a piston 108 adapted to be reciprocated therein. The piston 108 is secured to the rear end of the rod 106. A spring 109 is disposed within the opening in the shaft 49 and is adapted to normally bias the piston 108 and piston rod 106 to the right, as viewed in Figures 1 and 2. The rear end of the chamber 107 is enclosed by means of a suitable plug member 110. Fluid under pressure is adapted to be admitted to the chamber 107 between the piston 108 and the plug member 110 through a fluid passageway 107a formed in shaft 49. The passageway 107a opens radially into an annular groove 107b formed in the inner periphery of the stepped sleeve member 35. The groove 107b communicates with a fluid passageway 107c, into which passageway 107c fluid is adapted to be selectively admitted, as will be described fully hereinafter.

Admission of fluid under pressure into the chamber 107 urges the piston 108 and piston rod 106 to the left, as viewed in Figures 1 and 2. Disposed in the forward end of the opening in the shaft 49 is a spring 111 which, at its rear end, engages the forward end 66 of the rod 106 and, at its forward end, engages a cap member 112 secured at its edges in the shaft 49. The spring 111 is provided for normally biasing the piston rod 106 and piston 108 to the right, thereby cooperating with the aforedescribed spring member 109 disposed at the rear end of the opening in the shaft 49.

Generally, a light grade of oil is employed in the fluid torque converter, while a heavier grade of oil is employed in the hydraulic control system and for lubricating the transmission. In order to eliminate intermixing of the two grades of oil a plurality of axially spaced oil seals 219 are provided between the outer periphery of the rotatable shaft 49 and the inner periphery of the fixed sleeve member 35. Leakage of the heavier grade oil from the passageway 107a is returned to the transmission housing 53 through the passageway 220 formed in the sleeve member 35, while leakage of the lighter grade oil past the oil seal 234, disposed about the forward end of rod 106, into the central opening in shaft 49 is returned to the torque converter housing through passageway 235 in shaft 49 and passageway 249 in sleeve member 35.

Mounted on the outer splined periphery of the hub member 48, which supports the turbine element 46, is a clutch collar member 113. The clutch collar member 113 is formed with a plurality of radially extending clutch teeth 114 which are adapted to engage a plurality of radially extending clutch teeth 115 formed on the hub portion 27 supporting the closure member 24. The clutch collar member 113 is adapted to slide axially along the splined portion of the hub member 48. Disposed between the arms of the fork member 66, at the forward end of the piston rod 106, is a transverse pin member 116. The pin member 116 is disposed through a diametrical axially extending slot formed in the hub member 48 and shaft 49 and the ends of the pin 116 are secured in suitable openings formed in the clutch collar member 113. A spring 117 is disposed between the clutch collar member 113 and the hub member 48 for spring loading or cocking the clutch collar member 113. It will be understood that the force exerted by the spring 111 is greater than the force exerted by the spring 117.

When the clutch collar member 113 is in the position shown in Figures 1 and 2, and the flywheel 20 is rotating, drive is effected through the fluid torque converter 30 to the shaft 49 and hence to the transmission. When the clutch collar member 113 is shifted to the left from the position shown in Figure 1 and the clutch teeth 114 thereon are disposed in engagement with the clutch teeth 115 on the hub portion 47 direct drive is effected between the flywheel 20 and shaft 49. Engagement of clutch teeth 114 and 115 also locks the drive and driven elements 29 and 46 of the fluid torque converter 30 together, after which they rotate as a unit.

The aforedescribed construction and operation of the direct drive lock-up forms the subject matter of and is claimed in the copending application of Oscar H. Banker, Serial No. 178,656, filed August 10, 1950.

Figure 5:
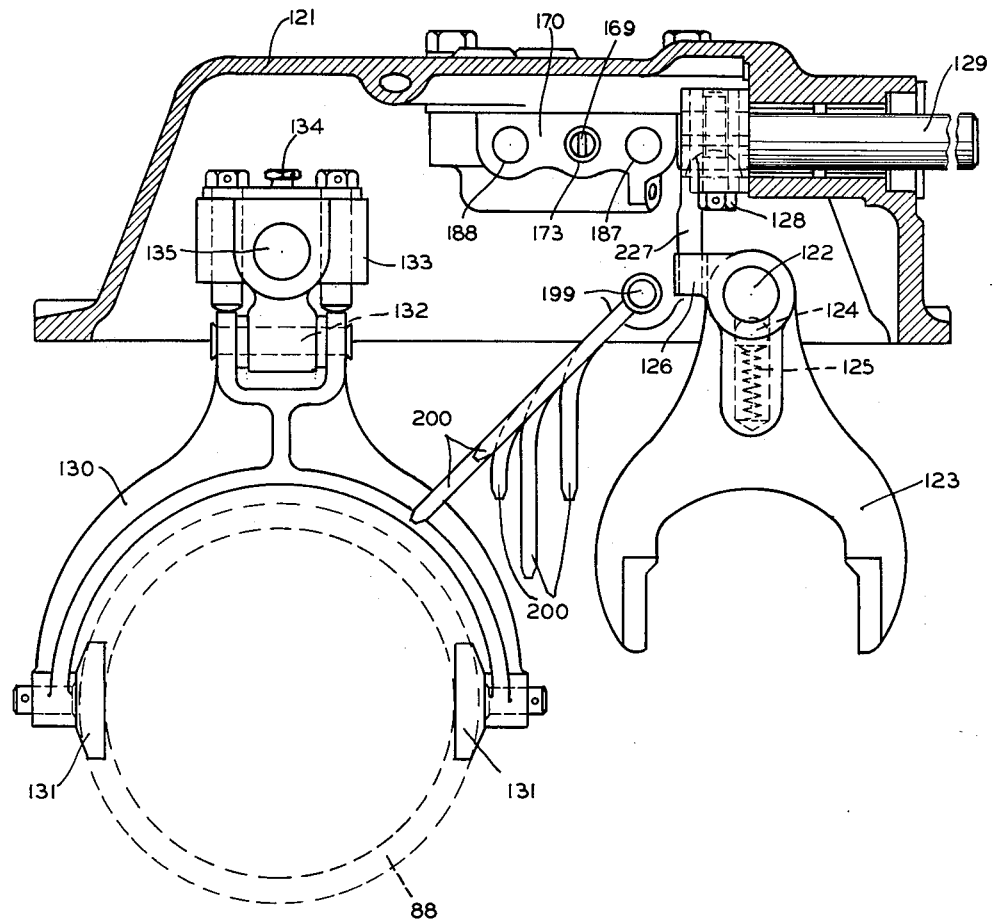
Figure 5 is a transverse vertical sectional view through the transmission cover, showing the shift forks of Figure 3.

Referring now to Figures 4 and 5, there is shown a cover member 121 which is adapted to be secured to the upper portion of the transmission housing 53. Extending lengthwise of the transmission, adjacent one side thereof, is a shift rail 122 which is suitably secured adjacent its ends in the forward and rear walls of the cover member 121. Mounted for axial movement along the shift rail 122 is a shift fork 123 which, when the cover member 121 is secured to the transmission housing 53, is adapted to be disposed in the annular groove formed in the clutch collar member 96 for effecting axial movement of the latter. Spaced detent means are formed in the lower portion of the shift rail 122 and a plunger 124, disposed in an opening formed in the hub portion of the shift fork 123, is biased by means of a spring 125 into engagement with one of the detent means in the shift rail 122 for positioning the shift fork 123 in one of a plurality of positions. The shift fork 123 is provided with a bifurcated upper end which is adapted to receive the lower end of a crank arm 127, the hub of which is suitably secured, as by means of a bolt 128, to a horizontally extending shaft 129 journaled in a boss of the cover member 121. The shaft 129 projects laterally outwardly of the cover member 121 and is adapted to cooperate with conventional gear shift linkage (not shown).

Rotation of the shaft 120 causes rotation of the crank arm 127 which, in turn, effects axial movement of the shift fork 123 along the shift rail 122. Movement of the shift fork 123 to the left, as viewed in Figure 4, positions the gear portion 97 of the clutch collar member 96 into engagement with the gear portion 98 of the compound reverse gear 99. Movement of the shift fork 123 to the right, as viewed in Figure 4, causes the clutch teeth 95 of the clutch collar member 96 to engage with the clutch teeth 94 of the gear 93, journaled on the countershaft 58.

Figure 3:
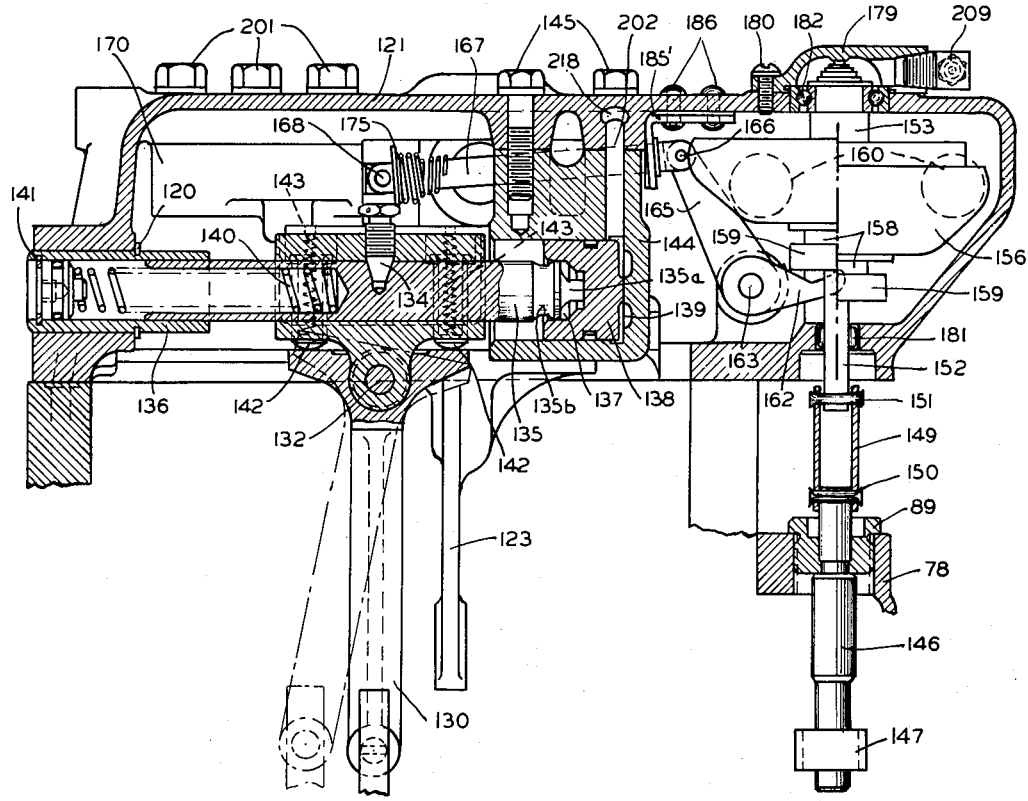
Figure 3 is a longitudinally extending vertical sectional view, through the transmission cover, showing the governor mechanism provided for controlling fluid flow to the clutch means, shown in Figure 2, together with the shift forks provided for shifting the clutch collar members of the transmission shown in Figure 1.

Referring now to Figures 3, 4 and 5, there is shown a shift fork 130 in which, at the lower end thereof, is rotatably mounted a pair of opposed facing jaw members 131. The pair of jaw members 131 are adapted to be disposed within the annular groove formed in the clutch collar member 88 when the cover member 121 is secured to the transmission casing 53. The shift fork 130, adjacent its upper end, is pivotally mounted, as by means of a pin member 132, to the depending leg of a box-like support member 133. The box member 133 is, in turn, fixedly mounted, as by a locating pin 134, to a horizontally extending piston rod 135.

The piston rod 135, adjacent its forward end, is journaled in a sleeve member 136 which is mounted in a horizontal opening formed in the forward depending wall of the cover member 121. The sleeve member 136 is held against forward movement by means of a retaining ring 120. The piston rod 135, at its rear end, is journaled in a bore 137 of a piston 138, which, in turn, is journaled within a horizontal opening formed in a bracket member 144 mounted, as by bolts 145, to the cover member 121. A chamber 139 is formed at the forward end of the piston 138 in the bracket member 144 into which chamber 139 fluid under pressure is adapted to be selectively admitted for effecting rectilinear movement of the piston 138 within the horizontal opening in the bracket member 144. The rear end of piston rod 135 is formed with an axially extending nose portion 135a and an annular groove 135b, which construction permits the end of the piston rod 135 to pivot within the piston 138, thereby preventing binding of the former within the latter. The piston rod 135 is hollowed out adjacent its forward end and a coil spring 140 is disposed therein for normally biasing the piston rod 135 and piston 138 to the position shown in Figure 3. The spring 140 bears against a plug member 141 suitably secured within the outer end of the sleeve member 136. A plurality of tubular plungers are disposed in vertical openings formed in the box-like member 133 adjacent each corner thereof. The bottom ends of plungers 142 are biased, by means of springs 143, into engagement with the upper end of shift fork 130, and while normally maintaining the fork 130 in a vertical position permit the latter to rock about the pivot pin 132.

When the piston rod 135 and piston 138 are in the position shown in Figure 3, and the shift fork 130 is in the solid line position, the clutch collar member 88 is in the position shown in Figure 1, with the clutch teeth 90 thereon in engagement with the clutch teeth 87 of the gear 85 thus providing a high ratio drive from shaft 49 to the output shaft 72 of the transmission. When the piston 138, piston rod 135, box member 133, and shift fork 130 are shifted to the left, from the position shown in Figure 3, the clutch collar member 88 is shifted to the left thus disposing the clutch 91 thereon into engagement with the clutch teeth 92 of gear 56 for providing a low ratio drive between the shaft 49 and the output shaft 72.

We shall now describe in connection with Figures 3 and 7 the governor mechanism provided for controlling shifts between high and low ratio drive, and for controlling coupling of the aforedescribed direct drive mechanism. The governor mechanism comprises a vertically extending shaft 146 which has mounted on its lower end a gear 147. The gear 147 engages with the gear 148 secured on flange 74 mounted on the output shaft 72, adjacent the rear end thereof, as shown in Figure 1. The upper end of the shaft 146 is journaled in a bushing member 89 mounted in the outlet of cap 78. Rotation of the output shaft 72 effects rotation of the governor shaft 146. The upper end of shaft 146 has a transverse slot formed therein which receives a horizontal pin member 150 secured, at its ends, within a vertical tubular sleeve member 149 adjacent the lower end thereof for supporting the latter. Secured at its ends to the tubular sleeve member 149, adjacent the upper end thereof, is a pin member 151 which is disposed within a transverse groove formed in the lower end of a vertically extending shaft 152. The pin member 151 extends parallel of the lower pin member 150. The shaft 152, adjacent its lower end, is journaled in a plurality of needle bearings 181 carried by cover member 121. Mounted on the shaft 152, adjacent the upper end thereof, is the vertical axially extending portion of a frame member 153 which is journaled adjacent its upper end within a ball bearing assembly 182 mounted with an opening in the top of the cover member 121. The upper end of shaft 152 is enclosed by a cap member 179 suitably secured, as by bolts 180, to the cover member 121. The frame member 153 has a radially extending flange portion 154 in which a plurality of radially extending grooves 155 are formed in the lower surface thereof. Disposed about the frame member 153 is an open top cup-shaped member 156 having an inclined periphery. The member 156 is suitably secured as by a plurality of circumferentially spaced rivets 157, to the radial flange of a hub member 158 mounted on the shaft 152 for rotation therewith. Mounted on the lower end of the hub member 158 is a ball bearing assembly 159. The hub member 158, together with the cup-shaped member 156 and the ball bearing assembly 159, are adapted to be moved as a unit along the shaft 152.

Disposed within the cup-shaped member 156 are a plurality of roller members 160 having peripheral band portions 161 which are guided in the radially extending slots 155 formed in the radial flange portion 154 of the hub member 153. Rotation of the output shaft 72 causes rotation of the gear 148, gear 147, shaft 146, tubular sleeve 149, shaft 152, together with frame member 153, and cup-shaped member 156. Rotation of the frame member 153 and cup-shaped member 156, in turn, causes the roller members 160 to be urged radially outwardly due to centrifugal force. The roller members 160 are adapted to ride along the inclined peripheral portion of the cup-shaped member 156 and, when the rollers 160 move radially outwardly, they wedge between the radial flange 154 of the frame member 153 and the cup-shaped member 156 causing the cup-shaped member 156, sleeve or hub member 158, and ball bearing assembly 159 to move downwardly.

The ball bearing assembly 159, adjacent each side thereof, is adapted to engage the outer ends of a pair of crank arms 162 which are disposed one on each side of the governor shaft 152. The crank arms 162 are fixed on a shaft 163, which shaft 163, adjacent its ends, is journaled within bearing members 164 carried by the cover member 121. Secured to the shaft 163, adjacent one end thereof, is a crank arm 165 which is secured, by means of a pin 166, to the bifurcated end of a draw rod 167. The other end of the draw rod 167 is also bifurcated and is secured, as by a pin member 168, to a valve member 169 disposed in a valve block 170. The valve block 170 is mounted to the cover member 121 by means of a plurality of bolts 201. The valve 169 has formed therein a pair of axially spaced peripheral channels 171 and 172 for a purpose which shall be described more fully hereinafter. Snap rings 174 and 174a are disposed within the opening 173 in the valve block 170, adjacent the opposite ends thereof, for limiting rectilinear movement of the valve 169.

Disposed about the draw rod 167, adjacent one end thereof, is a cup-shaped member 175 which is secured thereto by a transverse pin member 176. Journaled on the draw rod 167, adjacent the other end thereof, is a sleeve member 177 having a radial flange 178 formed integrally therewith. The end of sleeve member 177 is adapted to engage with a pin member 183 disposed transversely through the draw rod 167. Disposed about the sleeve member 177 is a cup-shaped member 184, like member 175, which abuts against the one leg of a substantially L-shaped bracket member 185' secured, as by rivets 186, to the cover member 121. The bracket member 185' has an opening formed therein through which the draw rod 167 and sleeve member 177 are adapted to extend. Disposed about the outer periphery of the draw rod 167, between the radial flange 178 of the sleeve member 177 and the cup-shaped member 175, is a prestressed coil spring 185. The prestressed spring 185 maintains the sleeve member 177 in contact with the pin member 183 when the draw rod 167 is in its normal position, as shown in Figure 7. Disposed concentrically about the spring 185 is a second spring 186 which, at its ends, engages the outer peripheral portions of the cup-shaped members 175 and 184. When the transmission is in operation and the governor mechanism is rotating, the aforedescribed roller members 160 tend to ride up the inclined peripheral surfaces of the cupshaped housing 156, thereby moving the latter downwardly, together with the hub member 158 and ball bearing assembly 159. Downward movement of the ball bearing assembly 159 causes the outer ends of crank arms 162 to rotate clockwise with respect to the mounting shaft 163 which, in turn, causes clockwise rotation of the crank arm 165, thereby urging the draw rod 167 to the right, as viewed in Figure 7. Initial movement of the draw rod 167 to the right compresses the outer coil spring 186 between the outer peripheral portions of the cup-shaped members 175 and 184. In an intermediate position of the draw rod 167, the radial flange portion 178 of the sleeve member 177 is adapted to engage with the one end of the cup-shaped member 184, and upon further movement of the draw rod 167 to the right both springs 185 and 186 are caused to be compressed. It will thus be understood that initial movement of the draw rod 167 to the right is resisted only by the force exerted by the one spring 186, but after reaching an intermediate position where the radial flange 178 of the sleeve member 177 contacts the cup-shaped member 184 further movement of the draw rod 167 is resisted by both springs 185 and 186.

When the speed of rotation of the transmission and governor mechanism initially decreases the roller members 160 return toward the central portion of the governor, permitting both springs 185 and 186 to urge the draw rod 167 to the left until the flange 178 of sleeve 177 is released from contact with the cup-shaped member 184. Upon a further decrease in speed the roller members 160 assume the position shown in Figure 7, whereupon the spring 186 is permitted to urge the draw rod 167 to the position shown in Figure 7. Simultaneously, the cup-shaped housing 156, together with hub member 158 and ball bearing assembly 159, are returned to their normal positions shown in Figure 7.

We shall now describe in connection with Figures 3, 4, 6, 8 and 9, the details of operation of the valve construction of our present invention. The valve block 170 has formed therein three parallel horizontally spaced apart openings 173, 187 and 188. Disposed in the central opening 173 is the aforedescribed valve 169. Formed in the peripheral wall of the central opening 173 are annular grooves 189, 190, 191, and 192. Formed in the opening 188 are annular grooves 193 and 194, which are placed in communication with the annular grooves 189 and 190 formed in the central opening 173.

Figure 6:
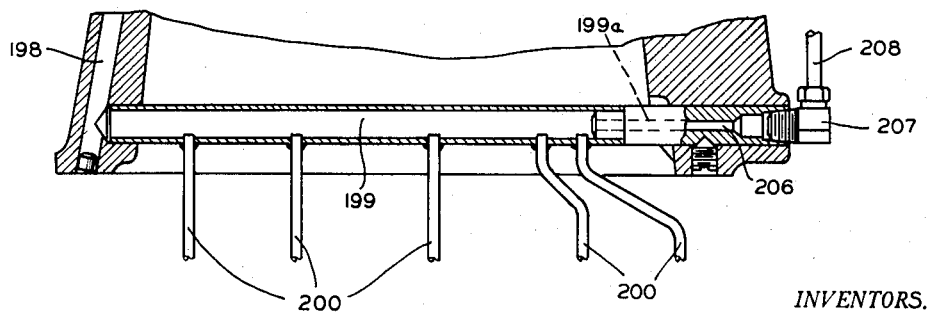
Figure 6 is a partial longitudinal vertical sectional view through the transmission cover, showing a plurality of oil dispensing tubes which are disposed conveniently throughout the transmission for lubricating the latter.

Formed in the valve block 170 are a plurality of vertical fluid passageways 195, 210, 214, 217, 225, 226, 227, and 233. The fluid passageway 195, at its lower end, communicates with the annular grooves 189 and 193, and at its upper end communicates with the lower end of a diagonal fluid passageway 196 formed in the cover member 121. The diagonal fluid passageway 196, at its upper end, communicates with one end of a horizontally extending fluid passageway 197, also formed in the cover member 121, which, at its outer end, communicates with the upper end of a vertically extending fluid passageway 198. The passageway 198, as best shown in Figure 6, opens at its lower end into a horizontally extending conduit 199 having an extension portion 199a, which conduit 199 and extension 199a are secured adjacent their one ends within the front and rear walls of the cover member 121. The conduit 199 has secured along its lower side, in communication therewith, a plurality of spaced oil dispensing tubes 200 which, when the cover member 121 is secured to the transmission housing 53, are adapted to be disposed at predetermined locations within housing 53 for lubricating certain of the gears. The conduit extension 199a, at its rear end, opens into the lower end of a conduit 208 through an elbow fitting 207. The conduit, as best shown in Figure 4, communicates at its upper end with an elbow fitting 209 which is threaded to the cover member 179 of the governor mechanism for transmitting lubricating fluid to the latter.

The fluid passageway 210, in the valve block 170 at its lower end, communicates with the annular grooves 190 and 194, and, at its upper end, communicates with the lower end of a diagonal fluid passageway 211 formed in the cover member 121, which diagonal fluid passageway 211, in turn, communicates, at its upper end, with a horizontally extending fluid passageway 212. The horizontally extending fluid passageway 212 is arranged parallel to the fluid passageway 197 and opens at its outer end into a vertically extending fluid passageway 213 formed in the forward wall of the cover member 121. The vertically extending fluid passageway 213, at its lowermost end, is connected to the output side of the auxiliary pump 61 through suitable conduit (not shown).

The fluid passageway 214, in the valve block 170, at its upper end, communicates with the annular groove 192 formed in the central opening 173, and, at its lower end, communicates with a horizontally extending fluid passageway 215 formed in a boss 216 of the valve block 170. The fluid passageway 217, at its lower end, communicates with the annular groove 191 formed in the central openings 173 and, at its upper end, communicates with a horizontally extending fluid passageway 218 formed in the cover member 121. The fluid passageway 218, at its other end, communicates with the upper end of a fluid passageway 202 formed in the cover member 121 and bracket member 144, which passageway 202 communicates, at its lower end, with the chamber 139 of the high and low ratio shift mechanism.

Formed in the periphery of the opening 187, in the valve block 170, are annular grooves 221, 222, 223, and 224. The fluid passageway 225, in the valve block 170, at its upper end, communicates with the annular groove 223 and, at its lower end, communicates with the horizontal fluid passageway 215. The fluid passageway 226, in the valve block 170, at its lower end, communicates with the annular groove 224 and, at its upper end, communicates with the lower end of a vertically extending fluid passageway 203 which passageway 203, at its upper end, opens outwardly of the transmission cover member 121, as shown in Figure 4. The fluid passageway 203 is adapted to be placed in communication with a fluid pressure responsive switch provided for actuating a transmission indicator light (not shown). If an indicator light is not to be used with the transmission, the fluid passageway 203 may be suitably closed with a plug member. The fluid passageway 233 communicates, at its lower end, with the annular channel 221. The fluid passageway 233 communicates, through a conduit (not shown), with the interior of the transmission housing 53.

The fluid passageway 227, in the valve block 170, at its lower end, communicates with the annular groove 222 in the opening 187 and, at its upper end, communicates with the lower end of a diagonal fluid passageway 228 formed in the cover member 121. The fluid passageway 228, at its upper end, communicates with a horizontally extending fluid passageway 229 which is formed in the cover member 121 parallel to the aforedescribed horizontal fluid passageways 197 and 212. The horizontal fluid passageway 229, at its outer end, opens into the upper end of a vertically extending fluid passageway 230, also formed in the cover member 121, which is adapted, when the cover member 121 is secured to the transmission housing 53, to be placed in communication with the aforedescribed fluid passageway 107c in the transmission housing 53 for transmitting fluid to chamber 107, located at the forward end of the direct drive coupling mechanism.

A diagonal fluid passageway is formed in the valve block 170, which passageway 231, at its lower end, communicates with the opening 187 in the valve block 170. The fluid passageway 231, at its upper end, opens into a vertically extending fluid passageway 236 formed in the cover member 121, which passageway 236, at its upper end, opens outwardly of the cover member 121.

Disposed within the opening 188, formed in the valve block 170, is a valve member 237 having an annular channel 238 formed in the central portion thereof and a nipple 239 formed at the forward end thereof which is adapted to abut a plug member 232 disposed in the forward end of opening 188. The valve 237 is normally biased to the right, as viewed in Figure 8, by means of a coil spring 240 held within the opening 188 by means of an end closure member 241. An axially extending orifice 253 is formed in the valve 237 adjacent the rear end thereof.

Disposed within the opening 187 in the valve block 170 is a valve member 242 having a pair of axially spaced annular channels 243 and 244 formed therein. The valve member 242 is formed at its one end with a nipple 245 which is adapted to abut a plug member 246 secured in the left end of the opening 187, as viewed in Figure 8. The valve member 242 is normally biased to the left, as viewed in Figure 8, by means of a coil spring 247 which is maintained in the opening 187 by means of an end closure member 248.

With the valves 169, 242, and 237 in the positions shown in Figure 8, the vertical fluid passageways 195 and 210 are interconnected by means of the annular channel 171 formed in the central valve 169. The vertical fluid passageways 225 and 227 are interconnected by means of the annular channel 244 formed in the valve 242. When the valve 169 is shifted a short distance to the right, the vertical fluid passageways 210 and 217 are interconnected by means of the annular channel 171. Upon further movement of the valve 169 to the extreme right position the vertical fluid passageways 210, 217 and 214 are interconnected by means of the annular channel 171. With the valve 169 in its extreme right position the vertical passageway 210 is placed in communication with the vertical fluid passageway 227, through the annular channel 171 formed in valve 169, the vertical fluid passageway 214, the horizontally extending fluid passageway 215, vertical fluid passageway 225, and annular channel 244.

When the valve 237 is shifted to the left from the position shown in Figure 8, the vertical fluid passageways 210 and 195 are interconnected by means of the annular channel 238.

When the valve 242 is shifted to the right from the position shown in Figure 8, the vertical fluid passageways 225 and 226, and passageways 227 and 233, are placed in communication by means of the annular channels 244 and 243, respectively.

Referring now to the drawings and, particularly, to Figure 10, showing the diagrammatic layout of the component parts of the aforedescribed transmission and control system of my present invention, I shall describe in detail the operation thereof.

When the fluid torque converter 30 is rotating at slow speed and the teeth 95 of the clutch collar member 96 are disposed in engagement with the teeth 94 on gear 93, so that high ratio drive is transmitted to the output shaft 72 from the converter 30, the governor shaft 146 is caused to rotate at a slow speed by the gear 148 on the output shaft 72.

Also, while the transmission is rotating at a slow speed, the fluid pump 61 mounted at the end of the countershaft 58 builds up fluid pressure, thereby forcing fluid drawn from the bottom of the transmission housing 53, through screen 204 and conduit 205, to the vertical fluid passageway 210 formed in the valve block 170, through conduit B comprising the vertical fluid passageway 213, horizontal fluid passageway 212, and diagonal passageway 211 formed in the cover member 121. The fluid under pressure is conveyed from the fluid passageway 210 through the annular channel 171 formed in the central valve member 169, to the vertical fluid passageway 195, where it is transmitted to the plurality of oil dispensing tubes 200, through the diagonal passageway 196, horizontal fluid passageway 197, vertical fluid passageway 198, and conduit 199.

Upon further acceleration of the fluid torque converter 30 the speed of rotation of the governor mechanism increases, thereby causing the roller member 160 to be thrown radially outwardly. During this radial outward movement of the rollers 160, the peripheral bands 161 thereof are guided in the radial slots 155 in the frame member 153, and the lower portion of the rollers 160 ride along the inclined periphery of the cup-shaped member 156, thereby forcing the latter downwardly, together with the hub member 158 and the ball bearing assembly 159. Downward movement of the ball bearing assembly 159 urges the outer end of the crank arm 162 to rotate in a clockwise direction, thereby rotating shaft 163 and crank arm 165 also in a clockwise direction, which pulls the draw rod 167 to the right, as viewed in Figure 7. Movement of the draw rod 167 to the right causes the valve 169 to be pulled to the right, as viewed in Figure 5, thereby placing the vertical fluid passageways 210 and 217 in communication through the annular channel 171 formed in the valve 169. Fluid is then transmitted to the chamber 139 adjacent the end of the high-low shift mechanism, shown in Figure 3, through the vertical fluid passageway 217, horizontal fluid passageway 218 and passageway 202.

Admission of fluid under pressure to the chamber 139 causes the piston 138, piston rod 135, and box member 133 to be shifted to the left from the position shown in Figure 3. If the gear 82 is driving the output shaft 72 the clutch collar member 88 will remain in the position shown in Figure 1 while the shift fork 130 rotates counterclockwise about the pin member 132. When the gear 82 and output shaft 72 rotate at substantially synchronous speed the plungers 142, at the right end of box member 133, as viewed in Figure 3, will cause the shift fork 130 to rotate clockwise about pin member 132 thereby thrusting the clutch collar member 88 to the left from the position shown in Figure 1 disengaging clutch teeth 87 and 90 and disposing the leading edges of clutch teeth 91 into contact with the leading edges of clutch teeth 92. The clutch teeth 91 will slide over the clutch teeth 92 until synchronous speed is reached, whereupon the teeth 91 are thrust into engagement with teeth 92 for providing a low ratio drive between the shaft 49 and the output shaft 72.

Upon further acceleration of the fluid torque converter 30 the governor rollers 160 tend to fly still further radially outwardly under centrifugal force, thereby urging the cup-shaped member 156, together with hub member 158, and ball bearing assembly 159 farther downward. This further downward movement of the ball bearing assembly 159 causes the outer end of the crank arm 162 to rotate farther in a clockwise direction which, in turn, causes rotation of the shaft 163 and crank arm 165 in a clockwise direction. Further clockwise rotation of the crank arm 165 pulls the draw rod 167 farther to the right, as viewed in Figure 7, which, in turn, pulls the valve 169 farther to the right, as viewed in Figure 8. When the valve 169 is disposed in its extreme right position, as viewed in Figure 8, the vertical fluid passageways 214, 217 and 210 are placed in communication by means of the annular channel 171 formed in the valve 169. Fluid admitted to the fluid passageway 214 is conveyed to the chamber 107, formed at the forward end of the shaft 49, shown in Figure 1, through the fluid passageway 215 formed in the valve block 170, vertical fluid passageway 225, annular channel 244 formed in the valve 242, vertical fluid passageway 227, and conduit A, shown diagrammatically in Figure 10, comprising diagonal fluid passageway 228, horizontal fluid passageway 229, vertical fluid passageway 230, passageway 107c, annular groove 107b, and passageway 107a.

When fluid under pressure is admitted to the chamber 107, through passageway 107c, annular groove 107b and passageway 107a, the piston 108, and piston rod 106 are urged to the left from the position shown in Figure 1, which compresses spring 111 and permits the spring 117 to bias the clutch collar member 113 to the left thereby disposing the leading edges of clutch teeth 114 into contact with the leading edges of clutch teeth 115. The clutch teeth 114 slide over the clutch teeth 115 until synchronous speed is reached, whereupon the clutch teeth 114 are thrust into engagement with clutch teeth 115, by the loaded spring 117, effecting a direct drive connection between the flywheel 20 and the shaft 49.

From the foregoing description it will be realized that upon initial rotation of the fluid torque converter 30 a high ratio drive is provided between the shaft 49 and the output shaft 72 for driving the vehicle at a low speed. Upon further acceleration of the fluid torque converter 30 the transmission is automatically conditioned for a shift from high ratio drive to low ratio drive which shift is effected when the shaft 49 and output shaft 72 rotate at substantially synchronous speed. Upon a still further increase in acceleration of the fluid torque converter 30 the transmission is conditioned for a shift to direct drive which shift is effected when the flywheel 20 and the shaft 49 rotate at substantially synchronous speed. The shift from high ratio to low ratio drive and the shift into direct drive are smoothly effected and are thus nearly imperceptible to a person riding in a vehicle with which our present transmission is associated.

When the valve 169 is shifted to the right from the position shown in Figure 8, the enlarged body portion of the valve 169 closes the annular groove 189 formed in the valve block 170, thereby cutting off the flow of fluid from the inlet fluid passageway 210 to the passageway 195 which, as aforedescribed, leads to the plurality of oil dispensing tubes 200. However, upon initial movement of the valve 169 to the right the oil pressure directed to the annular channel 238, formed in the valve 237, increase and flows through a metering orifice 253 formed in the valve 237, into the opening 188 forwardly of the valve 237. Fluid flowing through the orifice 253 causes the valve 237 to shift to the left, as viewed in Figure 8, thereby disposing the annular channel 238 between the annular grooves 193 and 194 formed in the opening 188 which places the fluid passageway 210 into communication with the fluid passageway 195. It will thus be readily understood that, regardless of the position of the central valve 169, oil is transmitted continually to the plurality of oil dispensing tubes 200 for lubricating the various gears and bearings of the transmission.

Upon a decrease in speed of the output shaft 72 the governor rollers 160 will move radially inwardly toward the central governor shaft 152, thereby permitting the cup-shaped member 156, together with hub member 158 and ball bearing assembly 159, to move upwardly about the shaft 152. Upon upward movement of the ball bearing assembly 159 the crank arms 162 and 165 rotate counterclockwise, and the draw rod 167, together with valve 169, is urged, by springs 185 and 186, to the left, as viewed in Figure 7. The valve 169, on shifting to the left, initially closes the annular groove 192 formed in the opening 173 in the valve block 170, thereby preventing fluid from communicating with the fluid passageway 214 which thus interrupts the flow of fluid to chamber 107 of the direct shift mechanism. When fluid flow to the chamber 107 is interrupted the springs 109 and 111, spring load the piston rod 106, piston 108, and clutch collar member 113, thereby tending to urge the clutch collar member 113 to return to the position shown in Figures 1 and 2. Although the clutch collar member 113 is spring loaded for movement to the right, such movement will not take place as long as the flywheel 20 drives the shaft 49 due to the force exerted on the faces of teeth 114 by the faces of teeth 115. However, when the flywheel 20 and shaft 49 rotate at substantially synchronous speed the force exerted on teeth 114 by teeth 115 is reduced, and the clutch collar member 113 is thrust to the right to the position shown in Figure 1, by springs 109 and 111. Drive is then effected through the fluid torque converter 30.

A further decrease in speed of the output shaft 72 causes the governor balls 160 to move to their central position permitting the cup-shaped member 156 to assume its uppermost position. Simultaneously, the draw rod is returned by spring 185 and 186 to the position shown in Figure 8. This further movement of the draw rod 167 to the left causes the valve 169 to shift to the left, and return to the position shown in Figure 8. In this position of the valve 169 fluid flow to the chamber 139 is interrupted.

When the fluid flow to chamber 139 is interrupted, the spring 140 returns the piston 138, piston rod 135, and box member 133 to the position shown in Figure 3. If the gear 56 is driving the output shaft 72, the clutch collar member 88 will remain in the left position above described while the shift fork 130 rotates clockwise about the pin member 132. When the gear 56 and output shaft 72 rotate at substantially synchronous speed, the plungers 142, at the left end of box member 133, as viewed in Figure 3, will cause the shift fork 130 to rotate counterclockwise about pin member 132 thereby thrusting the clutch collar member 88 toward the position shown in Figure 1 disengaging clutch teeth 91 and 92 and disposing the leading edges of clutch teeth 90 into contact with the leading edges of clutch teeth 87. The clutch teeth 90 will slide over the clutch teeth 87 until synchronous speed is reached, whereupon the teeth 90 are thrust into engagement with teeth 87. High ratio drive is then effected between the shaft 49 and the output shaft 72.

When the valve 169 is returned to the position shown in Figure 8 the passageways 210 and 195 are placed in communication through the channel 171, which permits the spring 240 to urge the valve 237 to the right. Movement of the valve 237 to the right is cushioned by the fluid trapped in the opening 188 between the plug member 232 and the end of the valve 237, which fluid is permitted to escape slowly through the orifice 253 in the valve 237. The momentarily trapped fluid also acts as a dampener for rectilinear oscillations of valve 237, caused by variations in fluid pressure exerted on the channel 238.

As best shown in Figure 10, an air valve, indicated diagrammatically at 255, is connected through an inlet tube 256 to a source of air under pressure (not shown) and is connected through an outlet tube 257 to a chamber 258 in which is disposed a diaphragm 259 normally biased to the right by means of a spring 260. The diaphragm 259 has secured to its left side, as viewed in Figure 10, a rod 261 which extends outwardly of the chamber 258 and has connection with the throttle of the engine, to which the transmission of my present invention is adapted to be associated. A tube 262, adjacent its one end, communicates with the tube 257 and, at its other end, communicates with fluid passageway 236 connected with the aforedescribed opening 231 in the valve block 170, as viewed in Figure 8. Interposed in the air line 262 is a check valve 263.

The air valve 255 is adapted to be opened by means of a solenoid, indicated diagrammatically at 264, which is electrically connected through a line 265 to a switch 266, which is mounted immediately below an accelerator pedal 267. The solenoid 264 is grounded at its other end by a line 268. The switch 266 has connection through a line 269 to a source of electrical energy, as, for example, a battery 270 which is suitably grounded through a line 271.

When the accelerator pedal 267 is pressed downwardly the switch 266 is closed and the solenoid 264 is energized which opens the air valve 255 for admitting air from the inlet line 256 to the opening 231 in valve block 170 through branch lines 257 and 262. Admission of air to the valve block 170 causes the valve member 242 to be shifted to the right from the position shown in Figure 8. Movement of the valve 242 to the right interferes with the flow of fluid from the passageway 225 to the passageway 227, which passageway 227, as aforedescribed, has connection with the chamber 107 of the direct drive shift mechanism. When fluid flow to the chamber 107 is interrupted the direct drive shift mechanism is conditioned for return to the position shown in Figure 1 and the shift mechanism is returned when the flywheel 20 and shaft 49 rotate at substantially synchronous speed, as fully described hereinbefore. Drive between the flywheel 20 and the shaft 49 is then again effected through the fluid torque converter 30. Also, when the valve 246 is shifted to the right the fluid passageways 225 and 226, and passageways 227 and 233, are placed into communication, respectively, and the fluid transmitted to the passageway 225 is effectively impressed in a suitable manner on the fluid pressure responsive indicator light switch (not shown) through conduit 203, while the fluid is simultaneously bled from chamber 107 through the return line 233. It will thus be seen that when the transmission is in direct drive, and it is desired to drive through the fluid torque converter 30 for accelerating purposes, the operator of the vehicle need only fully depress the accelerator pedal momentarily for conditioning the transmission for torque converter drive, thus, in effect, over-ruling the governor mechanism.

Upon reelase of the accelerator pedal 267, upward movement thereof is delayed through the rod 261 by means of the diaphragm 259 and the air under pressure admitted through the line 257 to the chamber 258 which prevents the transmission from returning to direct drive for a predetermined period of time.

Connected to the air tube 262 is the one end of an air tube 272 which, at its other end, communicates with a chamber 273 having a metering orifice 274 formed therein. Upon release of the air pressure the air is prevented from returning past the check valve 263 to the main valve 255. However, the air passes through the line 272 to the chamber 273 where it is slowly permitted to escape through the metering orifice 274. After the air is withdrawn from the opening 187 in valve block 170 the valve 242 is biased, by spring 247, to the position shown in Figure 8, thereby placing the passageways 225 and 227 again in communication. Fluid is then admitted to the chamber 107 which actuates the direct drive mechanism.

Associated with the low-high ratio shift mechanism is a solenoid 275 which is electrically connected at its one end through a line 276 and switch 277 to the battery 270. The solenoid, at its other end, is connected through a line 278 to ground. The switch 277 is adapted to be mounted to the dashboard of the vehicle with which the transmission is associated. When the switch 277 is closed the solenoid is energized and the latter opens a valve 279, interposed in fluid passageway 218, cutting off the flow of fluid to the passageway 202 leading to the chamber 139 of the low-high ratio shift mechanism and bleeds the fluid from chamber 139 through the outlet 202a which returns the fluid to the transmission housing 53. When the fluid is bled from the chamber 139 the coil spring 140 is permitted to return the piston 138, piston rod 135, and box member 133 to the position shown in Figure 3 conditioning the transmission for a shift from

17 low ratio drive to high ratio drive. As aforedescribed the clutch teeth 91 of the clutch collar member 88 are then disengaged from the clutch teeth 92 of gear 56 when synchronous speed is reached after which the clutch teeth 90 of clutch collar member 88 are disposed in engagement with clutch teeth 87 of gear 82 when synchronous speed therebetween is reached. It will thus be observed that when the solenoid 275 is energized the transmission is conditioned for return to high ratio drive, regardless of the speed of the torque converter 30, thus, in effect, overruling the governor mechanism. This arrangement is very desirable when it is necessary to stay in high ratio drive for considerable periods of time, as would be the case if the transmission were mounted in a vehicle hauling heavy loads or operating over hilly country.

While we have shown and described what we believe to be a preferred embodiment of our invention, it will be understood that various modifications and rearrangements may be made therein without departing from the spirit and scope of our present invention.

We claim:

1. In a transmission having a shaft, a gear rotatable on the shaft, an axially slidable clutch collar member mounted on the shaft and adapted to clutch the gear to the shaft, a shift mechanism for the clutch collar member comprising, a support member mounted for movement parallel to the axis of the shaft, a shift fork pivotally mounted at one end to said support member and at the other end engaging the clutch collar member, and means carried by said support member for normally biasing said shift fork to a position where the axis thereof is substantially perpendicular to the axis of movement of said support member.

2. In a transmission having a shaft, a pair of axially spaced gears rotatable on the shaft, an axially slidable clutch collar member mounted on the shaft intermediate the rotatable gears and adapted to clutch one of the gears to the shaft, a shift mechanism for the clutch collar member comprising, a support member mounted for movement parallel to the axis of the shaft, a shift fork pivotally mounted at one end to said support member and at the other end engaging the clutch collar member, and means carried by said support member for normally biasing said shift fork to a position where the axis thereof is substantially perpendicular to the axis of movement of said support member.

3. In a transmission having a shaft, a gear rotatable on the shaft, an axially slidable clutch collar mounted on the shaft and adapted to clutch the gear to the shaft, a shift mechanism for the clutch collar member comprising, a support member mounted for movement parallel to the axis of the shaft, a shift fork pivotally mounted at one end to said support member and at the other end engaging the clutch collar member, means carried by said support member for normally biasing said shift fork to a position where the axis thereof is substantially perpendicular to the axis of movement of said support member, and said last named means being adapted to spring load said shift fork when said support member is moved toward the gear for effecting snap engagement of the clutch collar member with the gear when the latter and the clutch collar member are rotating synchronously.

4. In a transmission having a shaft, a first gear rotatable on the shaft, a second gear rotatable on the shaft axially spaced from the first gear, an axially slidable clutch collar member mounted on the shaft intermediate the first and second gears and adapted to normally clutch the first gear to the shaft, a shift mechanism for the clutch collar member comprising, a support member mounted for movement parallel to the axis of the shaft, a shift fork pivotally mounted at one end to said support member and at the other end engaging the clutch collar member, and means for spring loading said shift fork when said support member is shifted toward the second gear for effecting disengagement of said clutch collar member and the first gear when the latter and the clutch collar member are rotating synchronously and for effecting snap engagement of the clutch collar member with the second gear when the latter and the clutch collar member are rotating synchronously.

5. In a transmission having a shaft, a gear rotatable on the shaft, an axially slidable clutch collar member mounted on the shaft and adapted to clutch the gear to the shaft, a shift mechanism for the clutch collar member comprising, a support member mounted for movement parallel to the axis of the shaft, a shift fork pivotally mounted at one end to said support member and at the other end engaging the clutch collar member, spring loaded plungers carried by said support member and engaging the one end of said shift fork, said spring loaded plungers adapted to normally bias said shift fork to a position where the axis thereof is substantially perpendicular to the axis of movement of said support member, and said spring loaded plungers being adapted to spring load said shift fork when said support member is moved toward the gear for effecting snap engagement of the clutch collar member with the gear when the latter and the clutch collar member are rotating synchronously.

6. In a transmission having a shaft, a gear rotatable on the shaft, an axially slidable clutch collar member mounted on the shaft and adapted to clutch the gear to the shaft, a shift mechanism for the clutch collar member comprising, a cylinder, a piston disposed in said cylinder and being adapted for movement parallel to the axis of the shaft, said cylinder being adapted to receive fluid under pressure for effecting movement of said piston, a support member associated with said piston for movement therewith, a shift fork pivotally mounted at one end to said support member and at the other end engaging the clutch collar member, means carried by said support member for normally biasing said shift fork to a position where the axis thereof is substantially perpendicular to the axis of movement of said support member, and said last named means being adapted to spring load said shift fork when fluid is admitted to said cylinder and said piston and support member are moved toward the gear for effecting snap engagement of the clutch collar member with the gear when the latter and the clutch collar member are rotating synchronously.

7. In a transmission having a shaft, a gear rotatable on the shaft, an axially slidable clutch collar member mounted on the shaft and adapted to clutch the gear to the shaft, a shift mechanism for the clutch collar member comprising, a cylinder having a closed end, a piston disposed in said cylinder and being adapted for movement parallel to the axis of the shaft, a piston rod carried at one end by said piston, a spring normally biasing said piston and piston rod toward the closed end of said cylinder, said cylinder being adapted to receive fluid under pressure at the closed end thereof for effecting movement of said piston and piston rod, a shift fork carried by said piston rod and pivotally mounted at one end about an axis extending perpendicular to the axis of said piston rod and at the other end engaging the clutch collar member, means carried by said piston rod for normally biasing said shift fork to a position where the axis thereof is substantially perpendicular to the axis of movement of said piston rod, and said last named means being adapted to spring load said shift fork when fluid is admitted to said cylinder and said piston and piston rod are moved toward the gear for effecting snap engagement of the clutch collar member with the gear when the latter and the clutch collar member are rotating synchronously.

8. In a transmission having a shaft adapted to be driven by a prime mover having a throttle valve, a gear rotatable on the shaft, an axially slidable clutch collar member mounted on the shaft and adapted to clutch the gear to the shaft, a shift mechanism for the clutch collar member comprising, a support member mounted for movement parallel to the axis of the shaft, a shift fork pivotally mounted at one end to said support member and at the other end engaging the clutch collar member, means carried by said support member for normally biasing said shift fork to a position where the axis thereof is substantially perpendicular to the axis of movement of said support member, said last named means being adapted to spring load said shift fork when said support member is moved towards the gear for effecting snap engagement of the clutch collar member with the gear when the latter and the clutch collar member are rotating synchronously, and said last named means permitting said clutch collar member to remain in engagement with the gear through the said support member is moved away from the gear until the throttle valve opening is reduced whereby the driving force exerted on the gear is reduced after which said clutch collar member will be snapped out of engagement with the gear.

9. In a transmission having a shaft driven by a prime mover having a throttle valve, a gear rotatable on the shaft, an axially slidable clutch collar member mounted on the shaft and adapted to clutch the gear to the shaft, a shift mechanism for the clutch collar member comprising, a support member mounted for movement parallel to the axis of the shaft, a shift fork pivotally mounted at one end to said support member and at the other end engaging the clutch collar member, spring loaded plungers carried by said support member for engaging the one end of said shift fork, said spring loaded plungers being adapted to normally bias said shift fork to a position where the axis thereof is substantially perpendicular to the axis of movement of said support member, said spring loaded plungers being adapted to spring load said shift fork when said support member is moved toward the gear for effecting snap engagement of the clutch collar member with the gear when the latter and the clutch collar member are rotating synchronously, and said spring loaded plungers being adapted to spring load the said shift fork when said support member is moved away from the gear for effecting snap disengagement of the clutch collar member with the gear when the throttle valve opening is reduced.

References Cited in the file of this patent
UNITED STATES PATENTS

| | | |
|---|---|---|
| 1,424,790 | Wiles | Aug. 8, 1922 |
| 2,223,614 | Hopkins | Dec. 3, 1940 |
| 2,348,763 | Syrovy et al. | May 16, 1944 |
| 2,374,303 | Osborne | Apr. 24, 1945 |
| 2,397,883 | Peterson et al. | Apr. 2, 1946 |
| 2,490,592 | Iavelli et al. | Dec. 6, 1949 |
| 2,490,604 | Syrovy et al. | Dec. 6, 1949 |
| 2,493,592 | Peabody | Jan. 3, 1950 |
| 2,562,464 | Jandasek | July 31, 1951 |
| 2,591,342 | Dodge | Apr. 1, 1952 |
| 2,634,621 | Kanuch | Apr. 14, 1953 |